US011893325B2

(12) United States Patent
Liu et al.

(10) Patent No.: US 11,893,325 B2
(45) Date of Patent: Feb. 6, 2024

(54) METHOD AND APPARATUS FOR SETTING EVACUATION EXIT UNDER CROWD EMERGENCY EVACUATION SCENARIO

(71) Applicant: CCTEG CHINESE INSTITUTE OF COAL SCIENCE, Beijing (CN)

(72) Inventors: Han Liu, Beijing (CN); Qingjie Qi, Beijing (CN); Yue Zhang, Beijing (CN); Jingwen Zhang, Beijing (CN); Jiamei Chai, Beijing (CN)

(73) Assignee: CCTEG CHINESE INSTITUTE OF COAL SCIENCE, Beijing (CN)

( * ) Notice: Subject to any disclaimer, the term of this patent is extended or adjusted under 35 U.S.C. 154(b) by 0 days.

(21) Appl. No.: 18/314,286

(22) Filed: May 9, 2023

(65) Prior Publication Data
US 2023/0367930 A1    Nov. 16, 2023

(30) Foreign Application Priority Data
May 10, 2022    (CN) .......................... 202210509344.X (51) Int. Cl.
*G06F 30/20* (2020.01)
*G06Q 90/00* (2006.01)
(Continued)

(52) U.S. Cl.
CPC ........... *G06F 30/20* (2020.01); *G06Q 90/205* (2013.01); *G06F 2111/06* (2020.01); *G06F 2111/10* (2020.01)

(58) Field of Classification Search
CPC .. G06F 30/20; G06F 2111/06; G06F 2111/10; G06Q 90/205
(Continued)

(56) References Cited

U.S. PATENT DOCUMENTS 9,794,755 B1 * 10/2017 South .................... H04W 4/021
10,026,278 B1 * 7/2018 Asaro .................. G01C 21/206
(Continued)

FOREIGN PATENT DOCUMENTS

CN    107220447    9/2017
CN    107679275    2/2018
(Continued)

OTHER PUBLICATIONS

Yahui Zhang (Optimization of Emergency Evacuation Strategy Based on Social Force Model, 2019, ISSS, pp. 379-382) (Year: 2019).*
(Continued)

*Primary Examiner* — Iftekhar A Khan
(74) *Attorney, Agent, or Firm* — Hodgson Russ LLP (57) ABSTRACT

A method and an apparatus for setting an evacuation exit under a crowd emergency evacuation scenario are provided. A simulation model is constructed based on a social force model, and a behavior parameter of an evacuating crowd under the crowd emergency evacuation scenario is obtained by a numerical approximation method with actual trajectory data of individuals in the evacuating crowd under a specific emergency evacuation scenario as a reference; an evacuation exit set is set, an integer programming solution for evacuation exit decision under the emergency evacuation scenario is constructed, and a total evacuation cost of the evacuation exit is obtained based on the simulation model; and reduction of the total evacuation cost is taken as an optimization target to construct an emergency evacuation optimization model based on constraint conditions, and the emergency evacuation optimization model is solved to obtain a recommended integer programming solution for evacuation exit decision.

18 Claims, 4 Drawing Sheets

(51) Int. Cl.
  *G06F 111/10* (2020.01)
  *G06F 111/06* (2020.01)
(58) Field of Classification Search
  USPC .............................................................. 703/6
  See application file for complete search history.

(56) References Cited

U.S. PATENT DOCUMENTS

| | | | | |
|---|---|---|---|---|
| 10,467,888 | B2* | 11/2019 | Beloglazov | G08B 27/00 |
| 10,733,853 | B2* | 8/2020 | Ichien | G08B 7/06 |
| 11,202,188 | B1* | 12/2021 | Baughman | G08B 7/066 |
| 11,417,106 | B1* | 8/2022 | Alzahrani | G06T 13/40 |
| 11,561,100 | B1* | 1/2023 | Grahn | G01C 21/206 |
| 2004/0172277 | A1* | 9/2004 | Dione | G06Q 30/02 |
| | | | | 705/324 |
| 2009/0306946 | A1* | 12/2009 | Badler | G06N 3/004 |
| | | | | 703/2 |
| 2010/0323334 | A1* | 12/2010 | Goforth | G09B 19/00 |
| | | | | 434/219 |
| 2011/0241877 | A1* | 10/2011 | Wedig | G08B 17/00 |
| | | | | 340/540 |
| 2014/0167969 | A1* | 6/2014 | Wedig | G08B 7/066 |
| | | | | 340/584 |
| 2014/0202791 | A1* | 7/2014 | Aldosari | A62B 1/20 |
| | | | | 182/48 |
| 2014/0372348 | A1* | 12/2014 | Lehmann | G06N 5/04 |
| | | | | 706/12 |
| 2015/0039364 | A1* | 2/2015 | Beraudier | G06Q 50/30 |
| | | | | 705/7.13 |
| 2016/0314554 | A1* | 10/2016 | Pillac | G08B 7/066 |
| 2016/0335552 | A1* | 11/2016 | Longo | G06N 5/047 |
| 2017/0177755 | A1* | 6/2017 | Beloglazov | G08B 27/00 |
| 2017/0243316 | A1* | 8/2017 | Pal | G06Q 90/205 |
| 2017/0316532 | A1* | 11/2017 | Tadano | G06Q 50/26 |
| 2017/0322039 | A1* | 11/2017 | Tadano | G06Q 10/063 |
| 2019/0066464 | A1* | 2/2019 | Wedig | G08B 27/001 |
| 2019/0152746 | A1* | 5/2019 | Chae | B66B 1/28 |
| 2019/0188977 | A1* | 6/2019 | Moses | H04W 4/024 |
| 2019/0376792 | A1* | 12/2019 | Chen | G01C 21/3647 |
| 2020/0334784 | A1* | 10/2020 | Borsos | G06N 20/00 |
| 2020/0364819 | A1* | 11/2020 | de Hoog | G06Q 90/205 |
| 2022/0090927 | A1* | 3/2022 | Shear | G01C 21/3492 |
| 2022/0307839 | A1* | 9/2022 | Nakamura | G06Q 90/205 |
| 2022/0353661 | A1* | 11/2022 | Shen | H04W 4/90 |
| 2023/0009081 | A1* | 1/2023 | Paripally | H04W 4/029 |
| 2023/0015773 | A1* | 1/2023 | Jia | G06F 30/27 |
| 2023/0090276 | A1* | 3/2023 | Colantuono | G08B 27/006 |
| | | | | 455/404.1 |
| 2023/0145066 | A1* | 5/2023 | Jeong | G08B 7/062 |
| | | | | 705/324 |

FOREIGN PATENT DOCUMENTS

| | | |
|---|---|---|
| CN | 108665103 | 10/2018 |
| CN | 114298438 | 4/2022 |
| JP | 2019016312 | 1/2019 |

OTHER PUBLICATIONS

Koster et al. (Avoiding numerical pitfalls in social force models, 2019, Physical Review E 87, 063305 (2013)) (Year: 2013).*

Wu, "Simulation of Aircraft Emergency Evacuation Based on Social Force Model," Dissertation for the Academic Degree of Master of Engineering, Civil Aviation University of China, May 2018.

Liu et al., "A Bi-objective Evacuation Routing Engineering Model with Secondary Evacuation Expected Costs," Systems Engineering Procedia, 2012, vol. 5.

Gao, "Research on Generative Design Method of Building Evacuation Door Position," A Thesis Submitted for the Degree of Master of Engineering, Huazhong University of Science and Technology, May 2019.

Guo et al., "Route choice in pedestrian evacuation under conditions of good and zero visibility: Experimental and simulation results," Transportation Research Part B: Methodological, Jul. 2012, vol. 46, No. 6.

Zhao et al., "An evacuation simulation method based on an improved artificial bee colony algorithm and a social force model," Applied Intelligence, Aug. 2020.

Han et al., "Modified social force model based on information transmission toward crowd evacuation simulation," Physica A, 2017, vol. 469.

CNIPA, Notification to Grant Patent Right for Invention for CN Application No. 202210509344.X, dated Oct. 10, 2022.

CNIPA, First Office Action for CN Application No. 202210509344. X, dated Sep. 1, 2022.

* cited by examiner

```
assign a = 1, b = 0.5, c = 2, d = 0.5;        Initialize Φ₁, Φ₂, Φ₃ to
  E(Φ₁) ≤ E(Φ₂) ≤ E(Φ₃);                       compute Φ_c = (Φ₁ + Φ₂)/2;
  while |1 - E(Φ₁)/E(Φ₃)| > ε do
    Compute Φ_r = Φ_c + a(Φ_c - Φ₃);
    if E(Φ₁) ≤ E(Φ_r) ≤ E(Φ₂) then
    |   Accept Φ₃ = Φ_r;
    end
    if E(Φ_r) ≤ E(Φ₁) then
    |   Compute Φ_e = Φ_c + c(Φ_r - Φ_c);
    |   if E(Φ_e) < E(Φ_r) then
    |   |   Accept Φ₃ = Φ_e
    |   else
    |   |   Accept Φ₃ = Φ_r
    |   end
    end
    if E(Φ_r) ≥ E(Φ₂) then
    |   if E(Φ₂) ≤ E(Φ_r) < E(Φ₃) then
    |   |   Compute Φ_cr = Φ_c + b(Φ_r - Φ_c);
    |   |   if E(Φ_cr) ≤ E(Φ_r)) then
    |   |   |   Accept Φ₃ = Φ_cr
    |   |   else
    |   |   |   Φ₂ = Φ₁ + d(Φ₂ - Φ₁), Φ₃ = Φ₁ + d(Φ₃ - Φ₁)
    |   |   end
    |   end
    |   if E(Φ₃) ≤ E(Φ_r) then
    |   |   Compute Φ_cr = Φ_c + b(Φ₃ - Φ_c);
    |   |   if E(Φ_cr) ≤ E(Φ₃)) then
    |   |   |   Accept Φ₃ = Φ_cr
    |   |   else
    |   |   |   Φ₂ = Φ₁ + d(Φ₂ - Φ₁), Φ₃ = Φ₁ + d(Φ₃ - Φ₁)
    |   |   end
    |   end
    end
    Order Φ₁, Φ₂, Φ₃ such that E(Φ₁) ≤ E(Φ₂) ≤ E(Φ₃);
end
```

METHOD AND APPARATUS FOR SETTING EVACUATION EXIT UNDER CROWD EMERGENCY EVACUATION SCENARIO

CROSS-REFERENCE TO RELATED APPLICATION

This application claims priority to Chinese Patent Application No. 202210509344.X, filed May 10, 2022, the entire disclosure of which is incorporated herein by reference.

TECHNICAL FIELD

The present disclosure relates to a technical field of evacuation simulation, and in particular, relates to a method for setting an evacuation exit under a crowd emergency evacuation scenario and an apparatus for setting an evacuation exit under a crowd emergency evacuation scenario.

BACKGROUND

In the related art, with the high-speed development of the society and economy, various large public activities gathering a large number of people have continuously increased. In some densely populated public buildings, due to an unreasonable design of the buildings and imperfect emergency management system, when various emergency events occur and people need to evacuate urgently, it is easy to cause congestion and jams in an evacuating crowd, or even serious stampede accidents.

In an existing crowd evacuation simulation technology, there is a lack of effective solution to optimize setting of an evacuation exit and improve evacuation efficiency.

SUMMARY

According to a first aspect of the present disclosure, a method for setting an evacuation exit under a crowd emergency evacuation scenario is provided. The method includes:
  constructing a simulation model based on a social force model, and obtaining a behavior parameter of an evacuating crowd under the crowd emergency evacuation scenario by a numerical approximation method with actual trajectory data of individuals in the evacuating crowd under a specific emergency evacuation scenario as a reference;
  setting an evacuation exit set, constructing an integer programming solution for evacuation exit decision under the crowd emergency evacuation scenario, and obtaining a total evacuation cost of the evacuation exit based on the simulation model; and
  taking reduction of the total evacuation cost as an optimization target to construct an emergency evacuation optimization model based on constraint conditions, and solving the emergency evacuation optimization model to obtain a recommended integer programming solution for evacuation exit decision.

According to a second aspect of the embodiment of the present disclosure, an apparatus for setting an evacuation exit under a crowd emergency evacuation scenario is provided, including:
  a scenario constructing module, configured to construct a simulation model based on a social force model, and obtain a behavior parameter of an evacuating crowd under the crowd emergency evacuation scenario by a numerical approximation method with actual trajectory data of individuals under the evacuating crowd in a specific emergency evacuation scenario as a reference;
  an exit setting module, configured to set an evacuation exit set, construct an integer programming solution for evacuation exit decision under the crowd emergency evacuation scenario, and obtain a total evacuation cost of the evacuation exit based on the simulation model; and
  an optimizing module, configured to take reduction of the total evacuation cost as an optimization target to construct an emergency evacuation optimization model based on constraint conditions, and solve the emergency evacuation optimization model to obtain a recommended integer programming solution for evacuation exit decision.

It should be understood that the above general descriptions and following detailed descriptions are only illustrative and descriptive, and may not be a limitation of the present disclosure.

BRIEF DESCRIPTION OF THE DRAWINGS

The drawings herein are incorporated into the specification and constitute a part of the specification, embodiments are shown in conformity with embodiments of the present disclosure, and the principle of the present disclosure is explained together with the specification, and do not be constituted an incorrect limitation of the present disclosure.

DETAILED DESCRIPTION

In order to make those skilled in the art better understand the technical solution of the present disclosure, the technical solution in embodiments of the present disclosure will be described clearly and completely in combination with the appended drawings in embodiments of the present disclosure.

It needs to be noted that, terms such as "first", "second" are used in the description and the appended claims of the present disclosure for purposes of distinguishing similar objects, are not intended to describe a specific order or a precedence order. It should be understood that such data used herein may be interchanged in an appropriate situation, so that the embodiments of the present disclosure described herein may be implemented in an order other than that illustrated or described herein. The implementations described in the following embodiments do not represent all implementations consistent with the present disclosure. Rather, they are merely examples of apparatuses and methods consistent with some aspects of the present disclosure as detailed in the appended claims.

In the related art, with the high-speed development of the society and economy, various large public activities gathering a large number of people have continuously increased. In some densely populated public buildings, due to an unreasonable design of the buildings and imperfect emergency management system, when various emergency events occur and people need to evacuate urgently, it is easy to cause congestion and jam in the evacuating crowd, or even serious stampede accidents. In the crowd evacuation simulation in the related art, with respect to the authenticity of the crowd evacuation simulation, there is a lack of effective solution to more truly reflect the behavior of the crowd so as to optimize setting of the evacuation exit and improve the evacuation efficiency.

The present disclosure provides a method and an apparatus for setting an evacuation exit under a crowd emergency evacuation scenario, to at least solve a problem of low evacuation efficiency in the related art. The technical solution will be described as follows.

The technical solution according to embodiments of the present disclosure at least have the following beneficial effect.

The behavior parameter is obtained based on the actual trajectory data, so that the obtained emergency evacuation scenario is closer to an actual scenario, which improves the authenticity of the simulation model. The integer programming model for the evacuation exit decision is adjusted based on the constraint conditions by taking the reduction of the total evacuation cost as the target, thereby improving the evacuation efficiency.

Figure 1:
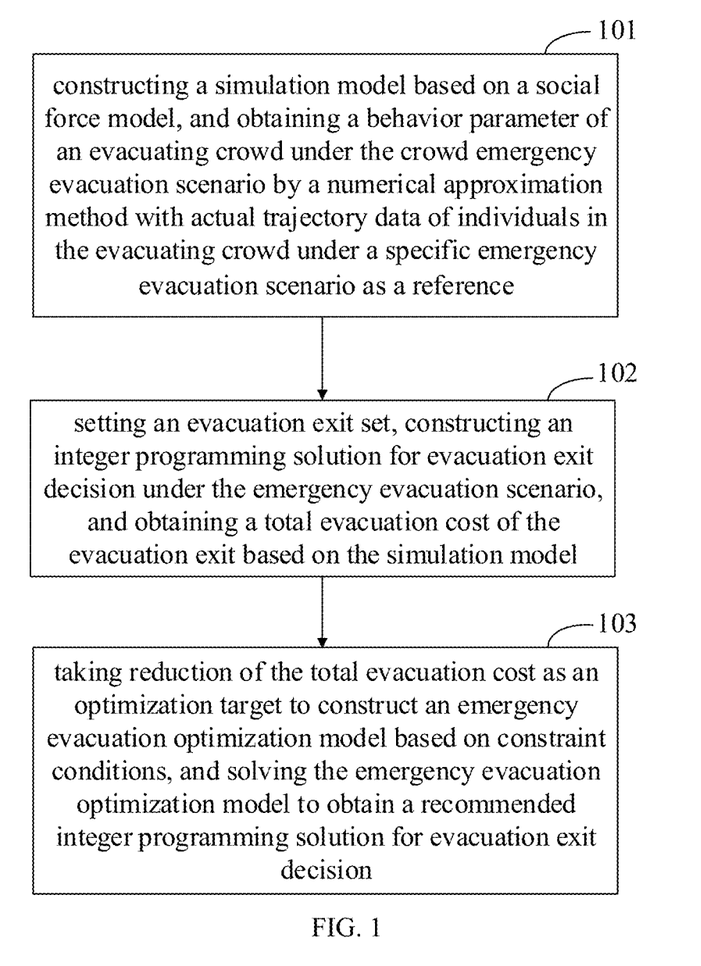
FIG. 1 is a flowchart illustrating a method for setting an evacuation exit under a crowd emergency evacuation scenario according to an embodiment.

FIG. 1 is a flowchart illustrating a method for setting an evacuation exit under a crowd emergency evacuation scenario according to an embodiment. As shown in FIG. 1, the method includes the following.

At block 101, a simulation model is constructed based on a social force model, and a behavior parameter of an evacuating crowd under the crowd emergency evacuation scenario is obtained by a numerical approximation method with actual trajectory data of individuals in the evacuating crowd under a specific emergency evacuation scenario as a reference.

In the embodiment of the present disclosure, the simulation model based on the social force model is used to simulate behavior of the crowd under the crowd emergency evacuation scenario. The social force model is based on Newtonian mechanics and describes responses of individuals to a surrounding environment under a specific scenario as a collective result of a series of forces. In the social force model, the force received by a current individual may be represented as $\vec{F}=\vec{F}_{destination}+\gamma\vec{F}_{circular}+\vec{F}_{wall}+\vec{F}_{obstacle}+\vec{F}_{elliptic}$. $\vec{F}_{destination}$ represents an acting force of guiding the individual to a destination. The smaller the $\tau$, which indicates that the current individual has more desire to quickly reach the destination, the larger the $\vec{F}_{destination}$. $\vec{F}_{circular}$ represents a circular acting force between individuals, and $\vec{F}_{circular}$ is related to a distance between the current individual and another individual. The smaller the distance between the individuals, the greater the $\vec{F}_{circular}$. $\gamma$ is a correction factor for the circular acting force, and represents a degree of influence of the circular acting force which is acted on the current individual by another individual affecting the current individual, and $\gamma$ is related to an angle between a speed vector of the current individual and a speed vector of another individual. $\vec{F}_{wall}$ represents an acting force acted on the current individual by a wall, the individual tends to keep a certain distance with the wall to ensure the comfort. $\vec{F}_{wall}$ represents an acting force used to maintain the distance between the current individual and the wall.

$\vec{F}_{obstacle}$ represents an acting force acted on the current individual by an obstacle under the emergency evacuation scenario. $\vec{F}_{elliptic}$ represents an elliptic acting force between the individuals, and is related to a relative rate and the distance between the current individual and another individual. The specific calculation way of each force will be described below.

$$\vec{F}_{destination} = \frac{d\vec{v}}{dt} \approx \frac{v^0 \cdot \vec{e^0}(t) - \vec{v}(t)}{\tau},$$

where $v^0$ represents an expected speed value of the current individual, $\vec{e^0}(t)$ is a unit vector at a moment t and represents a direction from a current position of the current individual to the destination. $\vec{v}(t)$ is a current speed vector of the current individual at the moment t, $\tau$ represents an expected guidance time of the current individual. The other component forces may be respectively represented as $$\vec{F}_{circular}(d) = \alpha_{circular} e^{-\frac{d}{\beta_{circular}}}, \vec{F}_{wall}(d) = \alpha_{wall} e^{-\frac{d}{\beta_{wall}}},$$

$$\vec{F}_{obstacle}(d) = \alpha_{obstacle} e^{-\frac{d}{\beta_{obstacle}}}, \vec{F}_{elliptic}(d) = \alpha_{elliptic} e^{-\frac{d}{\beta_{elliptic}}},$$

where $\alpha_{circular}$, $\alpha_{wall}$, $\alpha_{obstacle}$, $\alpha_{elliptic}$ represent first parameters in behavior parameters corresponding respectively to the component forces, and $\beta_{circular}$, $\beta_{wall}$, $\beta_{obstacle}$, $\beta_{elliptic}$ represent second parameters in the behavior parameters corresponding respectively to the component forces. d represents a distance between the current individual and a corresponding social force object. The social force object may be another individual, a wall or an obstacle. d in $\vec{F}_{circular}(d)$ represents the distance between the current individual and another individual. d in $\vec{F}_{wall}(d)$ represents the distance between the current individual and the wall. d in $\vec{F}_{obstacle}(d)$ distance between the current individual and the obstacle. d in $\vec{F}_{elliptic}(d)$ an represents the distance between the current individual and another individual. The values of the first parameters and the second parameters corresponding to different component forces under the emergency evacuation scenario may be different. In the present disclosure, the first parameters in the behavior parameters corresponding respectively to the component forces are fused into a common first parameter $\alpha$ and the second parameters in the behavior parameters corresponding respectively to the component forces are fused into a common second parameter $\beta$. A sum of the component forces $\gamma\vec{F}_{circular}+\vec{F}_{wall}+\vec{F}_{obstacle}+\vec{F}_{elliptic}$ may be represented as $$\vec{F}(d) = ae^{-\frac{d}{\beta}}.$$

It should be noted that the behavior of a specific evacuating crowd under the emergency evacuation scenario is studied in the present disclosure. The behavior characteristics of individuals of the evacuating crowd under the same emergency evacuation scenario are similar, so that the behavior parameter of the evacuating crowd may be used to represent the behavior parameters corresponding to all individuals in the evacuation crowd. The behavior parameter of the evacuating crowd includes the first parameter $\alpha$ and the second parameter $\beta$.

In a possible embodiment, the evacuating crowd includes children aged 4 to 6 years old, having similar thinking abilities, cognitive abilities and body physical characteristics, and similar behavior characteristics under the emergency evacuation scenario, so that the behavior parameter of the evacuating crowd may be used to represent the behavior parameters of all individuals in the evacuating crowd.

Optionally, α is a weighted average of $α_{circular}$, $α_{wait}$, $α_{obstacle}$, $α_{elliptic}$, β is a weighted average of $β_{circular}$, $β_{wall}$, $β_{obstacle}$, $β_{elliptic}$. The weight values of the first parameters and the second parameters of respective component forces may be determined by an implementer based on an actual situation.

In a possible embodiment, the weight values of the first parameters and the second parameters corresponding to respective component forces are all 0.25.

In a possible embodiment, a value range of $v^0$ is 0-2.

In a possible embodiment, a value of τ is 0.5.

Under a specific emergency evacuation scenario, coordinate data of the individuals in the evacuating crowd at each time point is obtained by sensors such as cameras, to generate the actual trajectory data. In order to make a crowd trajectory obtained by the simulation model close to the actual trajectory data, it is required to adjust the first parameter α and the second parameter β in the simulation model, to ensure that a proximity function value corresponding to the crowd trajectory obtained by the simulation model and the actual trajectory data is small.

At block 102, an evacuation exit set is set, an integer programming solution for evacuation exit decision under the emergency evacuation scenario is constructed, and a total evacuation cost of the evacuation exit is obtained based on the simulation model.

In the embodiment of the present disclosure, after the simulation model is obtained, in order to improve the evacuation efficiency under a complex crowd evacuation scenario, the evacuation exit set is provided, and the evacuation exit set includes coordinates of a plurality of evacuation exits. The integer programming solution for evacuation exit decision is used to determine whether to set an evacuation exit at a position of an evacuation exit in the evacuation exit set. The total evacuation cost when performing the evacuation based on the evacuation exit is calculated according to the simulation model.

At block 1ϕ3, reduction of the total evacuation cost is taken as an optimization target to construct an emergency evacuation optimization model based on constraint conditions, and the emergency evacuation optimization model is solved to obtain a recommended integer programming solution for evacuation exit decision.

In the embodiment of the present disclosure, in order to set an appropriate evacuation exit so as to improve the evacuation efficiency and reduce the evacuation cost, the emergency evacuation optimization model is constructed. The emergency evacuation optimization model includes the optimization target and the constraint conditions. The integer programming solution for evacuation exit decision is optimized based on the optimization target on the premise of meeting the constraint conditions, to obtain an optimal evacuation exit design solution, namely the recommended integer programming solution for evacuation exit decision.

Figure 2:
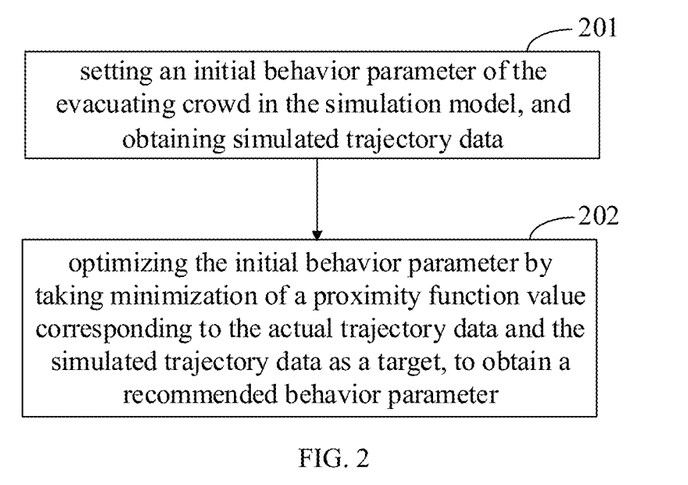
FIG. 2 is a flowchart illustrating a method for setting an evacuation exit under a crowd emergency evacuation scenario according to an embodiment.

FIG. 2 is a flowchart illustrating a method for setting an evacuation exit under a crowd emergency evacuation scenario according to an embodiment. As shown in FIG. 2, block 101 in FIG. 1 includes the following.

At block 201, an initial behavior parameter of the evacuating crowd in the simulation model is set, and simulated trajectory data is obtained.

In the embodiment of the present disclosure, the social force model is operated after the initial behavior parameter of the evacuating crowd is set, so that the simulated trajectory data of the evacuating crowd may be obtained. The simulated trajectory data includes the coordinate data of the individuals in the evacuating crowd at each time point.

At block 202, the initial behavior parameter is optimized by taking minimization of a proximity function value corresponding to the actual trajectory data and the simulated trajectory data as a target, to obtain a recommended behavior parameter.

In the embodiment of the present disclosure, the proximity function value corresponding to the actual trajectory data and the simulated trajectory data is $$E(\phi) = \sum_{m \in M} \sum_{t \in T} \Delta t \sqrt{[F_x^m(t) - f_x^m(t, \phi)]^2 + [F_y^m(t) - f_y^m(t, \phi)]^2}.$$

where, ϕ represents the behavior parameter, which includes the first parameter α and the second parameter β. E(ϕ) represents the proximity function value corresponding to m is a serial number of the current individual. M is a set of serial numbers of individuals. t represents a time point, and T is a set of time points. $F_x^m(t)$ and $F_y^m(t)$ represent an abscissa value and an ordinate value of an individual m at a moment t in the actual trajectory data, respectively. $f_x^m(t, \phi)$ and $f_y^m(t, \phi)$ represent an abscissa value and an ordinate value of the individual m at the moment t in the simulated trajectory data, respectively. The smaller the proximity function value, the closer the actual trajectory data is to the simulated trajectory data.

Optionally, the initial behavior parameter includes the first parameter α and the second parameter β, the initial behavior parameter is represented by ϕ=(α, β). Optimizing the initial behavior parameter by taking the minimization of the proximity function value corresponding to the actual trajectory data and the simulated trajectory data as the target to obtain the recommended behavior parameter includes:

setting three initial behavior parameters ϕ=(α, β), and obtaining the simulated trajectory data based on ϕ; and
calculating the proximity function value E(ϕ) corresponding to the simulated trajectory data and the actual trajectory data, and optimizing the initial behavior parameters based on the proximity function value to obtain the recommended behavior parameter. The recommended behavior parameter includes a first parameter recommendation value α' and a second parameter recommendation value β'.

In the embodiment of the present disclosure, the recommended behavior parameter is determined by the numerical approximation method, three different initial behavior parameters are set, and the initial behavior parameters are optimized based on the corresponding proximity function value. For a 2-variable function, 2+1 vertices are selected to form an initial polygon. Objective function values of the vertices are calculated and compared, to determine a vertex with a largest function value and a descent direction of the function value. A new vertex with a smaller function value is found to replace the vertex with the largest function value, so as to form a new polygon. In each iteration process, the vertex with the minimum objective function value is marked as a best vertex, while the vertex with the maximum objective function value is marked as a worst vertex. With the advance of the iteration process, the new polygon shrinks and approaches the vertex with the minimum value, and finally the vertex with the minimum value is obtained.

Figure 3:
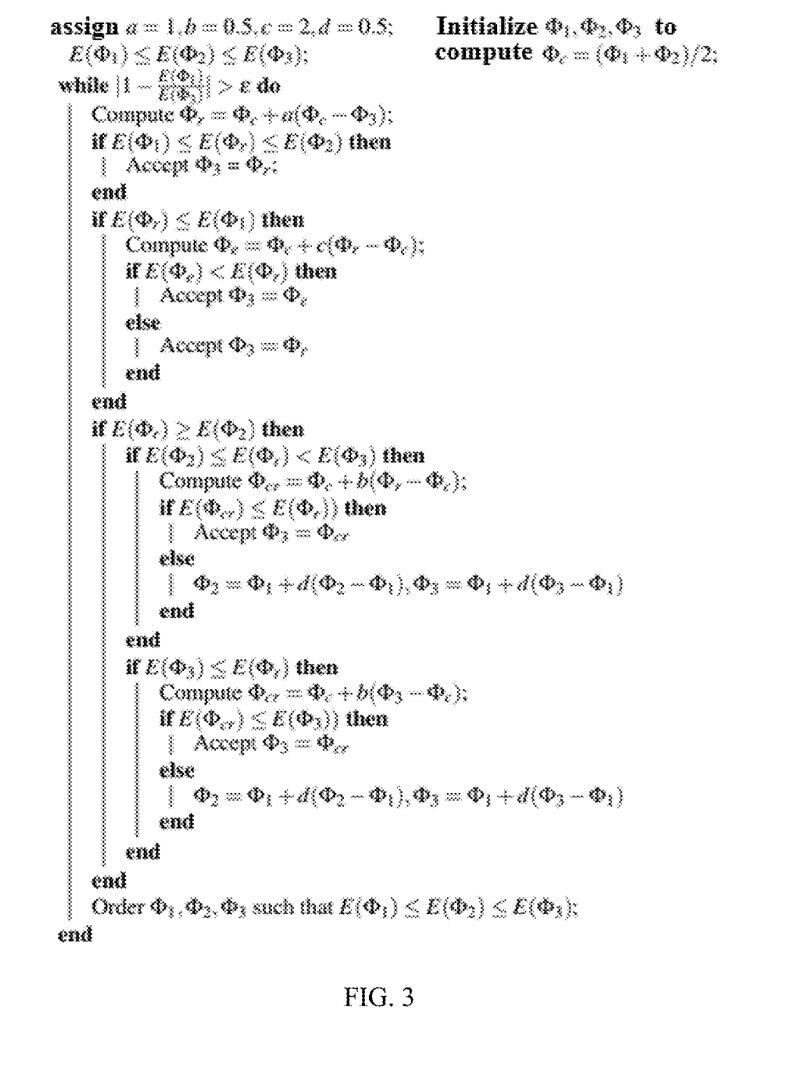
FIG. 3 is a flowchart illustrating a numerical approximation algorithm according to an embodiment.

FIG. 3 is a flowchart illustrating a numerical approximation algorithm according to an embodiment. As show in FIG. 3, the initial behavior parameters are optimized based on the proximity function value as follows.

Approximation algorithm parameters are assigned. The approximation algorithm parameters include a, b, c, and d;

The initial behavior parameters are initialized, proximity function values corresponding to the initial behavior parameters are calculated, and a first initial behavior parameter $\phi_1$, a second initial behavior parameter $\phi_2$, and a third initial behavior parameter $\phi_3$ are assigned based on an ascending order of the proximity function values.

Iterative optimization is performed on the initial behavior parameters until $$\left|1 - \frac{E(\phi_1)}{E(\phi_3)}\right| \leq \varepsilon,$$

and the first behavior parameter $\phi_1$ is determined as the recommended behavior parameter, where $\varepsilon$ is a tolerance.

In the embodiment of the present disclosure, the initial behavior parameters are sorted. The larger a serial number corresponding to the initial behavior parameter, the larger the corresponding proximity function value $E(\phi)$. The iterative optimization is performed on the initial behavior parameters. After each iteration, the initial behavior parameters are resorted and the iterative optimization is performed again until the maximum value and the minimum value of the proximity function value meet the tolerance, and then the iteration is stopped. The first initial behavior parameter $\phi_1$ corresponding to the minimum proximity function value is configured as the recommended behavior parameter.

Optionally, a=1, b=0.5, c=2, d=0.5.

Optionally, $\varepsilon$=1%.

Optionally, the method further includes:
performing computation to set $\phi_c=(\phi_1+\phi_2)/2$ and $\phi_r=\phi_c+a(\phi_c-\phi_3)$, where $\phi_c$ is a first intermediate parameter, $\phi_r$ is a second intermediate parameter.

Optionally, the method further includes:
if $E(\phi_1) \leq E(\phi_r) \leq E(\phi_2)$, then assigning the value of $\phi_r$ to $\phi_3$, outputting $\phi_3$, and ending the current iteration (corresponding to the End in FIG. 3).

Optionally, the method further includes:
if $E(\phi_r) \leq E(\phi_1)$ then computing $\phi_e = \phi_c + c(\phi_r - \phi_c)$, where $\phi_e$ is a third intermediate parameter.

Optionally, the method further includes:
if $E(\phi_e) \leq E(\phi_r)$, then assigning the value of $\phi_e$ to $\phi_3$, outputting $\phi_3$, and ending the current iteration;
if $E(\phi_e) > E(\phi_r)$, then assigning the value of $\phi_r$ $\phi_3$, outputting $\phi_3$, and ending the current iteration.

Optionally, the method further includes:
if $E(\phi_r) \notin E(\phi_2)$ and $E(\phi_2) \leq E(\phi_r) < (\phi_3)$, then computing $\phi_{cr} = \phi_c + b(\phi_r - \phi_c)$, where $\phi_{cr}$ is a forth intermediate parameter.

Optionally, the method further includes:
if $E(\phi_{cr}) \leq E(\phi_r)$, then assigning the value of $\phi_{cr}$ to $\phi_3$, outputting $\phi_3$, and ending the current iteration;
else, determining $\phi_2=\phi_1+d(\phi_2-\phi_1)$ and $\phi_3=\phi_1+d(\phi_3-\phi_1)$, outputting $\phi_2$ and $\phi_3$, and ending the current iteration.

Optionally, the method further includes:

if $E(\phi_r) \geq E(\phi_2)$ and $E(\phi_3) \leq E(\phi_r)$, then computing $\phi_{cr} = \phi_c + b(\phi_3 - \phi_c)$.

Optionally, the method further includes:
if $E(\phi_{cr}) \leq E(\phi_3)$, then assigning the value of $\phi_{cr}$ to $\phi_3$, outputting $\phi_3$, and ending the current iteration;
else, determining $\phi_2=\phi_1+d(\phi_2-\phi_1)$ and $\phi_3=\phi_1+d(\phi_3-\phi_1)$, outputting $\phi_2$ and $\phi_3$, and ending the current iteration.

After the iteration, $E(\phi_1)$, $E(\phi_2)$, $E(\phi_3)$ are sorted from small to large, and $\phi_1$, $\phi_2$, $\phi_3$ are renumbered. The greater the serial number of the initial behavior parameter, the greater the corresponding proximity function value $E(\phi)$. It is determined whether $$\left|1 - \frac{E(\phi_1)}{E(\phi_3)}\right| \leq \varepsilon$$

is satisfied, it yes, the iteration is ended and the first initial behavior parameter $\phi_1$ corresponding to the minimum proximity function value is taken as the recommended behavior parameter. The recommended behavior parameter includes the first parameter recommendation value $\alpha'$ and the second parameter recommendation value $\beta'$; if no, a new round of iteration is performed.

Optionally, the method further includes:
setting an iteration threshold; and if the number of iterations is greater than the iteration threshold, determining the first initial behavior parameters $\phi_1$ as the recommended behavior parameter.

In the embodiment of the present disclosure, if the number of iterations is large, it is difficult to make $$\left|1 - \frac{E(\phi_1)}{E(\phi_3)}\right|$$

satisfy me tolerance, me iteration process may be stopped, and the first initial behavior parameter $\phi_1$ is determined as the recommended behavior parameter.

Optionally, the iteration threshold is 100.

Optionally, the evacuation exit parameters are assigned. The steps of setting an evacuation exit set, constructing an integer programming solution for evacuation exit decision under the emergency evacuation scenario, and obtaining the total evacuation cost of the evacuation exit based on the simulation model may be performed as follows.

The evacuation exit set I is set, in which I includes coordinates of at least one evacuation exit i, the integer programming solution for evacuation exit decision includes a decision variable $Y_i$ corresponding to the evacuation exit i, and a value of $Y_i$ is 0 or 1. If $Y_i=1$, it indicates that an evacuation exit is set at the evacuation exit i; if $Y_i=0$, it indicates that no evacuation exit is set at the evacuation exit i. An evacuation area corresponding to the evacuation exit under the crowd emergency evacuation scenario is differentiated into a plurality of differential areas x. The evacuation area is a two-dimensional area within a certain range around the evacuation exit, and the evacuation area may be set by an implementer based on an actual situation. In a possible embodiment, the evacuation area is a circular area with the evacuation exit as a center.

The total evacuation cost is obtained based on a congestion degree parameter of the differential area x in combination with the simulated trajectory data of the individuals in the evacuating crowd. The congestion degree parameter of the differential area x is obtained based on the recommended behavior parameter, and the simulated trajectory data is obtained with the social force model based on the recommended behavior parameter. A formula of the total evacuation cost is expressed as:

$$N = \Sigma_{i \in I} \int_{x \in A_i} Y_i [v(x) + \alpha' \cdot u(x) |f(x)|^{\beta' \cdot w(x)} \cdot |f(x)|] dx + \rho \Sigma_{i \in I} C_i(Q_i),$$

where N is the total evacuation cost, $A_i$ is the evacuation area corresponding to the evacuation exit i, $v(x)$ is a speed parameter of the evacuating crowd in the differential area x, $\alpha' \cdot u(x)$ is a first congestion degree parameter of the differential area x, $u(x)$ is a coefficient of the first congestion degree parameter in the differential area x, $\alpha'$ is the first parameter recommendation value in the recommended behavior parameter, $f(x)$ is a crowd flow vector in the differential area x, $|f(x)|$ is a norm of the vector $f(x)$, representing a length. $f(x)$ may be obtained by analyzing traffic, speed, and density in the differential area x based on the simulated trajectory data. $\beta' \cdot w(x)$ is a second congestion degree parameter of differential area x, $w(x)$ is a coefficient of the second congestion degree parameter in the differential area x. $\beta'$ is the second parameter recommendation value in the recommended behavior parameter. $\rho$ is a penalty coefficient. $Q_i$ is the total number of the individuals passing through the evacuation exit i. $C_i$ is a crowd evacuation cost function at the evacuation exit i.

It should be noted that the above parameters may have different values under different emergency evacuation scenarios, and the values of the above parameters can be adjusted by the implementer according to the actual situation when implementing the invention.

In a possible embodiment, the value of $u(x)$ is 0.05.
In a possible embodiment, the value of $\alpha'$ is 2.72.
In a possible embodiment, the value of $w(x)$ is 0.315.
In a possible embodiment, the value of $\beta'$ is 0.20.
In a possible embodiment, the value of $\rho$ is 0.72.
In a possible embodiment, the value of $v(x)$ is 1.
In a possible embodiment, the value of $|f(x)|$ is 1.

In the embodiment of the present disclosure, the evacuation exit set I includes coordinates of the plurality of evacuation exits i, and the area near the evacuation exit i is configured as the evacuation area. The evacuation area under the emergency evacuation scenario is abstracted into a two-dimensional continuous area S, and S is differentiated into the plurality of differential areas x. $v(x) + \alpha' \cdot u(x) |f(x)|^{\beta' \cdot w(x)} \cdot |f(x)|$ in the expression of N reflects a congestion cost in the evacuation area, that is, a cost of congestion consumed by the individual in the crowd moving from an initial position to the evacuation area near the evacuation exit under the emergency evacuation scenario. $\alpha' \cdot u(x)$ and $\beta' \cdot w(x)$ collectively reflect the congestion degree of the differential area x in the evacuation area of the evacuation exit. $C_i(Q_i)$ is the cost function required for evacuating crowd at the evacuation exit i, that is, the cost of the crowd queuing at the evacuation exit i. The value of the decision variable $Y_i$ in the recommended integer programming solution for evacuation exit decision is used to determine whether to set the evacuation exit i. If $Y_i=1$, it indicates that an evacuation exit is set at the evacuation exit i; and if $Y_i=0$, it indicates that no evacuation exit is set at the evacuation exit i.

In a possible embodiment, $v(x)$ is a local free flow speed parameter in the differential area x.

Optionally, the constraint conditions include the following.

A first constraint condition: $\Sigma_{i \in I} f_i Y_i \leq P$, where $f_i$ is a construction cost of the evacuation exit i, $Y_i$ is the decision variable, and P is a construction cost threshold.

A second constraint condition: $Q_i \leq M_i Y_i$, $\forall i \in I$, where $Q_i$ is the total number of the individuals passing through the evacuation exit i, and $M_i$ is any positive integer greater than $Q_i$.

A third constraint condition: $Q_i = \int_{A_i} q(x) dx$, $\forall i \in I$, where $q(x)$ is an individual density in the differential area x.

A fourth constraint condition: $Y_i \in \{0,1\}$, $\forall i \in I$.

In the embodiment of the present disclosure, in order to ensure that the total cost of constructing the evacuation exit is not higher than an upper limit of cost, the first constraint condition is set. The decision variable $Y_i$ is used to determine whether to set an evacuation exit at the evacuation exit i in the evacuation exit set. If $Y_i=1$, it indicates that an evacuation exit is set at the evacuation exit i. If $Y_i=0$, it indicates that no evacuation exit is set at the evacuation exit i. The second constraint condition is used to ensure that $Q_i$ corresponding to the evacuation exit i which corresponds to $Y_i=0$ is 0.

A fifth constraint condition: $C_i(Q_i) = 1 + \tau_c Q_i$. When a certain evacuation exit has different numbers of evacuating people, different evacuation queuing costs corresponding to the exit are caused. When the number of evacuating people at a certain exit is small, the evacuation queuing cost corresponding to the exit is relatively low. With the increase of the number of evacuating people at the exit, the corresponding evacuation queuing cost is correspondingly increased. $\tau_c$ represents an evacuation cost coefficient, which indicates dependence of the evacuation queuing cost on the number of people passing through the exit.

In a possible embodiment, $\tau_c = 0.01$.

Optionally, after taking the reduction of the total evacuation cost as the optimization target, constructing the emergency evacuation optimization model based on the constraint conditions, and solving the emergency evacuation optimization model to obtain the recommended integer programming solution for evacuation exit decision, the method further includes:

setting an evacuation exit at the coordinates of the evacuation exit i corresponding to $Y_i$ whose value is 1 in the recommended integer programming solution for evacuation exit decision.

In the embodiment of the present disclosure, the value of $Y_i$ in the integer programming model for evacuation exit decision is adjusted by an optimization algorithm, the integer programming solution for evacuation exit decision with the minimum total evacuation cost N is determined as the recommended integer programming solution for evacuation exit decision. It is determined, based on the value of $Y_i$ in the recommended integer programming solution, whether an evacuation exit is set at the coordinates of the evacuation exit. If $Y_i=1$ corresponding to the evacuation exit i, an evacuation exit is set at the evacuation exit i, and if $Y_i=0$ corresponding to the evacuation exit i, no evacuation exit is set evacuation exit i. With the recommended integer programming solution for evacuation exit decision, pedestrian evacuation may be efficiently performed under the crowd emergency evacuation scenario, thereby improving evacuation efficiency.

In a possible embodiment, an emergency evacuation optimization model is constructed based on a Cplex optimization solver in a GMS platform on a personal computer with 3.30 GHz CPU and 16 GB memory, to solve the optimization problem. A maximum computing time is set to 3600 seconds. The data of each parameter in the constraint conditions, the parameter data in the formula of the total evacuation cost and the optimization target are stored in the memory of the personal computer. The memory of the personal computer also stores instructions executable by a processor. The processor is configured to execute the instructions to implement the method for setting an evacuation exit under a crowd emergency evacuation scenario. The first parameter recommendation value α' and the second parameter recommendation value β' in the recommended behavior parameter are input into the emergency evacuation optimization model, to optimize $Y_i$ corresponding to each exit in the emergency evacuation optimization model. After the maximum computing time is reached, the recommended integer programming solution for evacuation exit decision is obtained. GAP is set to 0.1%.

Figure 4:
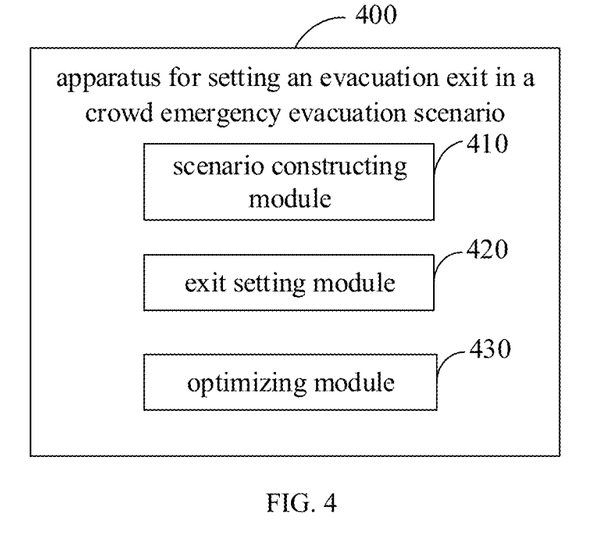
FIG. 4 is a block diagram illustrating an apparatus for setting an evacuation exit under a crowd emergency evacuation scenario according to an embodiment.

FIG. 4 is a block diagram illustrating an apparatus for setting an evacuation exit under a crowd emergency evacuation scenario according to an embodiment. Referring to FIG. 4, the apparatus 400 includes a scenario constructing module 410, an exit setting module 420 and an optimizing module 430.

The scenario constructing module 410 is configured to construct a simulation model based on a social force model, and obtain a behavior parameter of an evacuating crowd under the crowd emergency evacuation scenario by a numerical approximation method with actual trajectory data of individuals in the evacuating crowd under a specific emergency evacuation scenario as a reference.

The exit setting module 420 is configured to set an evacuation exit set, construct an integer programming solution for evacuation exit decision under the emergency evacuation scenario, and obtain a total evacuation cost of the evacuation exit based on the simulation model.

The optimizing module 430 is configured to take reduction of the total evacuation cost as an optimization target to construct an emergency evacuation optimization model based on constraint conditions, and solve the emergency evacuation optimization model to obtain a recommended integer programming solution for evacuation exit decision.

With regard to the apparatus in the above embodiments, the specific way in which each module performs the operation has been described in detail in the embodiments of the method and will not be elaborated here.

After considering the specification and practicing the present disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for setting an evacuation exit under a crowd emergency evacuation scenario in a building, comprising:
capturing images of individuals with a plurality of cameras in the building;
obtaining coordinate data and physical characteristics of the individuals in the building from the captured images during the crowd emergency evacuation scenario in the building;
constructing a simulation model based on a social force model, and obtaining a behavior parameter of an evacuating crowd under the crowd emergency evacuation scenario in the building by a numerical approximation method with actual trajectory data of individuals in the evacuating crowd under a specific emergency evacuation scenario in the building as a reference, wherein the simulation model is constructed based on behavior characteristics of individuals having similar physical characteristics to the physical characteristics of the individuals in the evacuating crowd;
setting an evacuation exit set from a plurality of evacuation exits i in the building, constructing an integer programming solution for evacuation exit decision under the crowd emergency evacuation scenario in the building, and obtaining a total evacuation cost of the evacuation exit based on the simulation model;
taking reduction of the total evacuation cost as an optimization target to construct an emergency evacuation optimization model based on constraint conditions, and solving the emergency evacuation optimization model to obtain a recommended integer programming solution for evacuation exit decision, wherein a maximum computing time for solving the emergency evacuation optimization model is 3600 seconds; and
controlling the plurality of evacuation exits i in the building to indicate either an evacuation exit or no evacuation exit based upon the recommended integer programming solution for evacuation exit decision;
wherein the trajectory data comprises the coordinate data of the individuals in the evacuating crowd at each time point obtained by the plurality of cameras in the building, and obtaining the behavior parameter of the evacuating crowd under the crowd emergency evacuation scenario by the numerical approximation method with the actual trajectory data of the individuals in the evacuating crowd under the specific emergency evacuation scenario in the building as the reference comprises:
setting an initial behavior parameter of the evacuating crowd in the simulation model, and obtaining simulated trajectory data; and
optimizing the initial behavior parameter by taking minimization of a proximity function value corresponding to the actual trajectory data and the simulated trajectory data as a target, to obtain a recommended behavior parameter;
wherein the initial behavior parameter comprises a first parameter α and a second parameter β, the initial behavior parameter is represented by $\phi=(\alpha, \beta)$, and optimizing the initial behavior parameter by taking the minimization of the proximity function value corresponding to the actual trajectory data and the simulated trajectory data as the target, to obtain the recommended behavior parameter comprises:
setting three initial behavior parameters $\phi=(\alpha, \beta)$, and obtaining the simulated trajectory data based on φ; and
calculating the proximity function values E(φ) corresponding to the simulated trajectory data and the actual trajectory data, and optimizing the initial behavior parameters based on the proximity function values to obtain the recommended behavior parameter, wherein the recommended behavior parameter comprises a first parameter recommendation value $\alpha'$ and a second parameter recommendation value $\beta'$;

wherein optimizing the initial behavior parameters based on the proximity function values comprises:

calculating the proximity function values corresponding to the initial behavior parameters, and setting a first initial behavior parameter $\phi_1$, a second initial behavior parameter $\phi_2$, and a third initial behavior parameter $\phi_3$ based on an ascending order of the proximity function values; and performing iterative optimization on the initial behavior parameters until $$\left|1 - \frac{E(\phi_1)}{E(\phi_3)}\right| \leq \varepsilon,$$

and determining the first initial behavior parameter $\phi_1$ as the recommended behavior parameter, where $\varepsilon$ is a tolerance;

wherein setting the evacuation exit set from the plurality of evacuation exits i in the building, constructing the integer programming solution for evacuation exit decision under the emergency evacuation scenario in the building, and obtaining the total evacuation cost of the evacuation exit based on the simulation model comprises:

differentiating an evacuation area corresponding to the evacuation exit under the crowd emergency evacuation scenario into a plurality of differential areas x; and obtaining the total evacuation cost based on a congestion degree parameter of each differential area x obtained based on the recommended behavior parameter in combination with the simulated trajectory data of the individuals in the evacuating crowd;

wherein the evacuation exit set I is set, wherein the evacuation exit set I includes coordinates of the plurality of evacuation exits i within the building, the integer programming solution for evacuation exit decision comprises a decision variable $Y_i$ corresponding to each evacuation exit i, and a value of $Y_i$ is 0 or 1;

wherein after taking the reduction of the total evacuation cost as the optimization target to construct the emergency evacuation optimization model based on the constraint conditions, and solving the emergency evacuation optimization model to obtain the recommended integer programming solution for evacuation exit decision, the method further comprises:

setting an evacuation exit at the coordinates of the evacuation exit i within the building corresponding to $Y_i$ whose value is 1 in the recommended integer programming solution for evacuation exit decision, such that a total number of individuals passing through the evacuation exit i within the building corresponding to $Y_i$ whose value is 0 in the recommended integer programming solution for evacuation exit decision is 0.

2. The method according to claim 1, further comprising: setting $\phi_c = (\phi_1 + \phi_2)/2$, and setting $\phi_r = \phi_c + a(\phi_c - \phi_3)$, where $\phi_c$ is a first intermediate parameter, $\phi_r$ is a second intermediate parameter, and a is a first preset approximation algorithm parameter.

3. The method according to claim 2, further comprising: if $E(\phi_1) \leq E(\phi_r) \leq E(\phi_2)$, assigning a value of $\phi_r$ to $\phi_3$, outputting $\phi_3$, and ending a current iteration.

4. The method according to claim 2, further comprising: if $E(\phi_r) \leq E(\phi_1)$, calculating $\phi_e = \phi_c + c(\phi_r - \phi_c)$, where $\phi_e$ is a third intermediate parameter, and c is a second preset approximation algorithm parameter.

5. The method according to claim 4, further comprising: if $E(\phi_e) < E(\phi_r)$, assigning a value of $\phi_e$ to $\phi_3$, outputting $\phi_3$, and ending a current iteration; and if $E(\phi_e) > E(\phi_r)$, assigning a value of $\phi_r$ to $\phi_3$, outputting $\phi_3$, and ending the current iteration.

6. The method according to claim 2, further comprising: if $E(\phi_r) \geq E(\phi_2)$ and $E(\phi_2) \leq E(\phi_r) < (\phi_3)$, calculating $\phi_{cr} = \phi_c + b(\phi_r - \phi_c)$, where $\phi_{cr}$ is a fourth intermediate parameter, and b is a third preset approximation algorithm parameter.

7. The method according to claim 6, further comprising: if $E(\phi_{cr}) \leq E(\phi_r)$, assigning a value of $\phi_{cr}$ to $\phi_3$, outputting $\phi_3$, and ending a current iteration; and if $E(\phi_{cr}) > E(\phi_r)$, determining $\phi_2 = \phi_1 + d(\phi_2 - \phi_1)$, $\phi_3 = \phi_1 + d(\phi_3 - \phi_1)$, outputting $\phi_2$ and $\phi_3$, and ending the current iteration, where d is a fourth preset approximation algorithm parameter.

8. The method according to claim 2, further comprising: if $E(\phi_r) \geq E(\phi_2)$ and $E(\phi_3) \leq E(\phi_r)$, calculating $\phi_{cr} = \phi_c + b(\phi_3 - \phi_{cr})$.

9. The method according to claim 8, further comprising: if $E(\phi_{cr}) \leq E(\phi_3)$, assigning a value of $\phi_{cr}$ to $\phi_3$, outputting $\phi_3$, and ending a current iteration; and if $E(\phi_{cr}) > E(\phi_3)$, determining $\phi_2 = \phi_1 + d(\phi_2 - \phi_1)$ and $\phi_3 = \phi_1 + d(\phi_3 - \phi_1)$, outputting $\phi_2$ and $\phi_3$, and ending the current iteration.

10. The method according to claim 9, further comprising: setting an iteration threshold; and if a number of iterations is greater than the iteration threshold, determining the first initial behavior parameter $\phi_1$ as the recommended behavior parameter.

11. The method according to claim 1,
wherein a formula of the total evacuation cost is expressed as:

$$N = \sum_{i \in I} \int_{x \in A_i} Y_i \left[ v(x) + \alpha' \cdot u(x) |f(x)|^{\beta' \cdot w(x)} \cdot |f(x)| \right] dx + \rho \sum_{i \in I} C_i(Q_i)$$

where N is the total evacuation cost, $A_i$ is the evacuation area corresponding to the evacuation exit i, $v(x)$ is a speed parameter of the evacuating crowd in the differential area x, $\alpha' \cdot u(x)$ is a first congestion degree parameter of the differential area x, $u(x)$ is a coefficient of the first congestion degree parameter, $f(x)$ is a crowd flow vector in the differential area x, $\beta' \cdot w(x)$ is a second congestion degree parameter of the differential area x, $w(x)$ is a coefficient of the second congestion degree parameter, $\rho$ is a penalty coefficient, $Q_i$ is a total number of individuals passing through the evacuation exit i, and $C_i$ is a crowd evacuation cost function at the evacuation exit i.

12. The method according to claim 11, wherein the constraint conditions comprise:

a first constraint condition: $\Sigma_{i \in I} f_i Y_i \leq P$, where $f_i$ is a construction cost of the evacuation exit i, $Y_i$ is the decision variable, and P is a construction cost threshold;

a second constraint condition: $Q_i \leq M_i Y_i$, $\forall i \in I$, where $Q_i$ is the total number of the individuals passing through the evacuation exit i, and $M_i$ is any positive integer greater than $Q_i$;

a third constraint condition: $Q_i = \int_{A_i} q(x)dx$, $\forall i \in I$, where $q(x)$ is an individual density in the differential area x;

a fourth constraint condition: $Y_i \in \{0,1\}$, $\forall i \in I$; and a fifth constraint condition: $C_i(Q_i) = 1 + \tau_c Q_i$, where $\tau_c$ is an evacuation cost coefficient.

13. A system for setting an evacuation exit under a crowd emergency evacuation scenario in a building, comprising:

a plurality of cameras configured to capture images of individuals in the building;

at least one processor; and a memory communicatively coupled to the at least one processor;

wherein the memory is stored with instructions executable by the at least one processor, when the instructions are executed by the at least one processor, the at least one processor is configured to:

obtain coordinate data and physical characteristics of the individuals in the building from the captured images during the crowd emergency evacuation scenario in the building;

construct a simulation model based on a social force model, and obtain a behavior parameter of an evacuating crowd under the crowd emergency evacuation scenario in the building by a numerical approximation method with actual trajectory data of individuals in the evacuating crowd under a specific emergency evacuation scenario in the building as a reference, wherein the simulation model is constructed based on behavior characteristics of individuals having similar physical characteristics to the physical characteristics of the individuals in the evacuating crowd;

set an evacuation exit set from a plurality of evacuation exits i in the building, construct an integer programming solution for evacuation exit decision under the emergency evacuation scenario in the building, and obtain a total evacuation cost of the evacuation exit based on the simulation model;

take reduction of the total evacuation cost as an optimization target to construct an emergency evacuation optimization model based on constraint conditions, and solve the emergency evacuation optimization model to obtain a recommended integer programming solution for evacuation exit decision, wherein a maximum computing time for solving the emergency evacuation optimization model is 3600 seconds; and control the plurality of evacuation exits i in the building to indicate either an evacuation exit or no evacuation exit based upon the recommended integer programming solution for evacuation exit decision;

wherein the trajectory data comprises the coordinate data of the individuals in the evacuating crowd at each time point obtained by the plurality of cameras in the building, and the at least one processor is configured to:

set an initial behavior parameter of the evacuating crowd in the simulation model, and obtain simulated trajectory data; and optimize the initial behavior parameter by taking minimization of a proximity function value corresponding to the actual trajectory data and the simulated trajectory data as a target, to obtain a recommended behavior parameter;

wherein the initial behavior parameter comprises a first parameter $\alpha$ and a second parameter $\beta$, the initial behavior parameter is represented by $\phi = (\alpha, \beta)$, and the at least one processor the scenario constructing module is configured to:

set three initial behavior parameters $\phi = (\alpha, \beta)$, and obtain the simulated trajectory data based on $\phi$; and calculate the proximity function values $E(\phi)$ corresponding to the simulated trajectory data and the actual trajectory data, and optimize the initial behavior parameters based on the proximity function values to obtain the recommended behavior parameter, wherein the recommended behavior parameter comprises a first parameter recommendation value $\alpha'$ and a second parameter recommendation value $\beta'$;

wherein the at least one processor is configured to:

calculate the proximity function values corresponding to the initial behavior parameters, and set a first initial behavior parameter $\phi_1$, a second initial behavior parameter $\phi_2$, and a third initial behavior parameter $\phi_3$ based on an ascending order of the proximity function values; and perform iterative optimization on the initial behavior parameters until $$\left| 1 - \frac{E(\phi_1)}{E(\phi_3)} \right| \leq \varepsilon,$$

and determine the first initial behavior parameter $\phi_1$ as the recommended behavior parameter, where $\varepsilon$ is a tolerance;

wherein the at least one processor is configured to:

differentiate an evacuation area corresponding to the evacuation exit under the crowd emergency evacuation scenario into a plurality of differential areas x; and obtain the total evacuation cost based on a congestion degree parameter of each differential area x obtained based on the recommended behavior parameter in combination with the simulated trajectory data of the individuals in the evacuating crowd;

wherein the evacuation exit set I is set, wherein the evacuation exit set I includes coordinates of the plurality of evacuation exits i within the building, the integer programming solution for evacuation exit decision comprises a decision variable $Y_i$ corresponding to each evacuation exit i, and a value of $Y_i$ is 0 or 1;

wherein the at least one processor is further configured to:

set an evacuation exit at the coordinates of the evacuation exit i within the building corresponding to $Y_i$ whose value is 1 in the recommended integer programming solution for evacuation exit decision, such that a total number of individuals passing through the evacuation exit i within the building corresponding to $Y_i$ whose value is 0 in the recommended integer programming solution for evacuation exit decision is 0.

14. The system according to claim 13, wherein the at least one processor is further configured to:

set $\phi_c = (\phi_1 + \phi_2)/2$, and set $\phi_r = \phi_c + a(\phi_c - \phi_3)$, where $\phi_c$ is a first intermediate parameter, $\phi_r$ is a second intermediate parameter, and a is a first preset approximation algorithm parameter.

15. The system according to claim 14, wherein the at least one processor is further configured to:

if $E(\phi_1) \leq E(\phi_r) \leq E(\phi_2)$, assign a value of $\phi_r$ to $\phi_3$, output $\phi_3$, and end a current iteration.

16. The system according to claim 14, wherein the at least one processor is further configured to:

if $E(\phi_r) \leq E(\phi_1)$, calculating $\phi_e = \phi_c + c(\phi_r - \phi_c)$, where $\phi_e$ is a third intermediate parameter, and c is a second preset approximation algorithm parameter.

17. The system according to claim 13, wherein a formula of the total evacuation cost is expressed as:

$$N = \sum_{i \in I} \int_{x \in A_i} Y_i \left[ v(x) + \alpha' \cdot u(x) |f(x)|^{\beta' \cdot w(x)} \cdot |f(x)| \right] dx + \rho \sum_{i \in I} C_i(Q_i)$$

where N is the total evacuation cost, $A_i$ is the evacuation area corresponding to the evacuation exit i, $v(x)$ is a speed parameter of the evacuating crowd in the differential area x, $\alpha' \cdot u(x)$ is a first congestion degree parameter of the differential area x, $u(x)$ is a coefficient of the first congestion degree parameter, $f(x)$ is a crowd flow vector in the differential area x, $\beta' \cdot w(x)$ is a second congestion degree parameter of the differential area x, $w(x)$ is a coefficient of the second congestion degree parameter, $\rho$ is a penalty coefficient, $Q_i$ is a total number of individuals passing through the evacuation exit i, and $C_i$ is a crowd evacuation cost function at the evacuation exit i.

18. The system according to claim 17, wherein the constraint conditions comprise:
a first constraint condition: $\Sigma_{i \in I} f_i Y_i \leq P$, where $f_i$ is a construction cost of the evacuation exit i, $Y_i$ is the decision variable, and P is a construction cost threshold;
a second constraint condition: $Q_i \leq M_i Y_i$, $\forall i \in I$, where $Q_i$ is the total number of the individuals passing through the evacuation exit i, and $M_i$ is any positive integer greater than $Q_i$;
a third constraint condition: $Q_i = \int_{A_i} q(x) dx$, $\forall i \in I$, where $q(x)$ is an individual density in the differential area x;
a fourth constraint condition: $Y_i \in \{0,1\}$, $\forall i \in I$; and
a fifth constraint condition: $C_i(Q_i) = 1 + \tau_c Q_i$, where $\tau_c$ is an evacuation cost coefficient.

\* \* \* \* \*